3,567,630
REVERSE OSMOSIS MEMBRANES FROM AMORPHOUS COPOLYMERS OF AN ALKYLENE OXIDE AND ALLYL GLYCIDYL ETHER
Carl A. Lukach, Wilmington, Del., assignor to Hercules Incorporated, Wilmington, Del.
No Drawing. Filed Sept. 29, 1969, Ser. No. 862,073
Int. Cl. B01d 13/00
U.S. Cl. 210—23
16 Claims

ABSTRACT OF THE DISCLOSURE

Reverse osmosis membranes characterized by a salt-rejecting layer of an amorphous copolymer of an alkylene oxide and allyl glycidyl ether. The membranes are useful for desalination and other processes involving reverse osmosis.

---

The present invention relates to semipermeable membranes useful for desalting brackish and sea water through reverse osmosis, as well as for other applications involving reverse osmosis.

One of the present commercial methods for the desalination of water involves forcing the saline water under pressure through a semipermeable membrane which discriminates between salt ions and water molecules, allowing water molecules to pass nearly uninhibited through the membrane while rejecting the larger salt ions. At the present time the only semipermeable membranes used commercially in the desalination of water are composed of either cellulose acetate or a derivative of nylon. The cellulose acetate membranes are either symmetric membranes made from dense cellulose acetate or asymmetric ultrathin membranes known as Loeb-type membranes. See U.S. Pats. 3,133,132 and 3,133,137. Membranes made from nylon derivatives are a more recent development and are marketed under the trademark "Permasep" in the form of hollow fibers.

There are two factors that are important in judging the performance of a semipermeable membrane for the desalination of water. First, it must reject at least 95% of salt ions and, secondly, it must have an acceptable flux rate which is a measure of the number of gallons of water per square foot per day (GFD) which can be forced through the membrane. Unfortunately, in the case of any given polymer these two properties are normally inversely proportional to each other, i.e., the higher the salt-rejecting capacity, the lower the flux rate, and vice versa.

From the standpoint of initial performance, asymmetric Loeb-type cellulose acetate membranes are outstanding. In commercial use they are capable of rejecting more than 95% of sodium and chloride ions at a flux rate of 10-20 gallons per day. However, they possess poor resistance to compaction and are susceptible to hydrolytic and biological degradation. Hence, under many operating conditions, they have short membrane lifetimes. On the other hand, Permasep membranes have excellent resistance to compaction and biological degradation but have extremely low flux rates in the order of 0.01-0.1 GFD.

The present invention relates to novel reverse osmosis membranes useful for desalination of water and other purposes. The membranes of the invention are characterized by a salt-rejecting layer comprising a thin film of an amorphous copolymer of allyl glycidyl ether and an alkylene oxide, as hereinafter defined. The experimental techniques by which the membranes of the present invention have been prepared have not been sufficiently refined to produce a membrane having a salt-rejecting layer as thin as the ultrathin salt-rejecting layer of the asymmetric Loeb-type cellulose acetate membranes, and for this reason it is not possible to compare directly the flux rates of the present membranes with those of the asymmetric Loeb-type membranes. However, allowing for the greater thickness of the salt-rejecting layer in the membranes of the invention, as prepared to date, the flux rate of the more permeable of the membranes of the invention is surprisingly high and calculated on an equivalent thickness basis equal to or better than the asymmetric Loeb-type membranes. Furthermore, great versatility is achievable in the membranes of the invention in that by variation in chemical and physical structures it is possible to vary salt-rejecting capacity and flux rate over a wide range. Thus, for example, membranes having a very high flux rate and modest salt-rejecting capacity can be prepared which are useful primarily for purposes other than desalination of water, while membranes of good flux rate and high salt-rejecting capacity can be prepared which are eminently useful for desalination of water. In addition the membranes of the invention possess the advantage of being highly resistant to compaction and to hydrolytic and biological degradation and, hence, have long lifetimes under most operating conditions.

The amorphous copolymer from which the reverse osmosis membranes of the invention are prepared is comprised of from 1 to 60 mole percent of allyl glycidyl ether and from 40 to 99 mole percent of an alkylene oxide having from 2 to 6 carbon atoms and has a reduced specific viscosity (RSV) of at least 0.5 as measured on a 0.1% solution of the copolymer in alpha-chloronaphthalene (or other appropriate solvent) at 100° C., and a weight average molecular weight of at least 50,000.

Although useful reverse osmosis membranes can be prepared from the amorphous copolymer without modification, the membranes so prepared tend to have low salt-rejecting capacity, and their prime utility is in applications less critical than the desalination of water. Hence, for desalination applications, it is preferred that the amorphous copolymer either be cross-linked or modified by addition of a basic polyamide derived from a dibasic fatty acid.

The effect of cross-linking is to decrease the hydrophilic character of the polymer whereby it is rendered less permeable to salt ions, although at the expense of a reduced flux rate. Cross-linking can be effected by any of several processes known to the art, for example, by reaction with a polyfunctional nitrile oxide, as will be more fully described hereinafter.

It is not known by what mechanism the addition of a basic polyamide improves the salt-rejecting capacity of the copolymer. However, experiments have shown conclusively that the addition of such polyamides in amounts up to about 150% by weight of the copolymer results in membranes having substantially higher salt-rejecting capacity, albeit a lower flux rate.

The membranes of the invention have as their salt-rejecting layer a thin film of an amorphous copolymer, optionally cross-linked or modified as described. From the structural viewpoint there are two principal classes of membranes, i.e., (1) membranes which are composed of a thin film of the copolymer supported on a microporous substrate which is permeable to saline water, and (2) membranes consisting of a thin walled hollow fiber of the copolymer. The supported membranes of class (1) can be of any convenient shape, e.g., flat, tubular, spiral or corrugated, while those of class (2), being unsupported, are necessarily in the form of hollow fiber. The thin film of the copolymer, which is a component of both structural classes of membranes, can be prepared by any of the methods known to the art for fabrication of films from moldable polymers such as casting, coating, extrusion, compression molding, and the like. The substrate can be any of the porous materials used in the membrane art for the same purpose. In preparing the membranes of class (1) the copolymer film is simply disposed as a layer on a substrate and may or may not be adhered thereto.

The following examples are presented for purposes of illustrating the invention and not by way of limitation. Parts and percentages are by weight unless otherwise indicated.

EXAMPLE 1

A 4 x 5-inch sheet of filter material composed of mixed esters of cellulose of $0.01\mu$ pore size (Millipore Corporation VF filter material) was floated on the surface of deionized water, with the dull side down for 5 minutes. The sheet was lifted with forceps, tilted to drain off excess water, and placed, wet side down, upon a glass plate. A piece of adhesive tape was placed across the top edge to hold the sheet to the glass.

A 10 g. sample of a copolymer of allyl glycidyl ether and propylene oxide, containing 95 mole percent propylene oxide and a RSV 7.5, was dissolved in 300 ml. of toluene. The solution was filtered under pressure through a $1.2\mu$ pore size filter. To 20 ml. of this 3.34% (w./v.) solution was added a predetermined quantity of a filtered solution of a basic polyamide in toluene (20% concentration) to provide an amount of polyamide equal to 20% by weight of the polymer. After mixing well by stirring, the polymer solution was placed near the top of the prewet VF substrate beneath the leading edge of a ten-mil casting blade 2½ inches wide. After drawing the solution across the entire length of the substrate with the casting knife, the glass plate was placed in a level position in a cabinet through which filtered air was circulated. After 4 hours, a dry film of calculated thickness 0.33 mil was obtained deposited on the substrate. The glass plate containing the film and substrate was then heated at 80° C. for 16 hours.

The basic polyamide employed in this example was prepared by reacting polymerized soybean oil acids with triethylene tetramine to produce an intermediate resin having an amine number of 225 and a Brookfield viscosity of 500 poises at 40° C., and then reacting 9 parts of the resin with 1 part of tetraethylene pentamine for 2 hours at 200° C., giving a final polyamide having an amine number of 300 and a viscosity at 25° C. of about 500 poises.

A 47-mm. diameter disc was cut from the above membrane. Soaking in water helped remove the cut disc from the glass plate. The membrane was then evaluated as follows.

TEST APPARATUS AND METHOD

Each test cell consisted of a 6-bolt 47-mm. high pressure filter holder which holds a 47-mm. diameter membrane on a support screen between two stainless steel plates. An additional hole was drilled into the top plate, so that the brine solution could enter the cell, circulate over the membrane, and leave the cell. The permeate was collected from the bottom part of the cell and analyzed.

Eight such cells were connected in parallel, through a series of suitable valves, to three back pressure regulators, a pump and a 100-gallon reservoir, to provide a recirculating assembly capable of evaluating eight membranes simultaneously at two different pressures (four cells at each pressure). Pumping rates were up to 0.5 gallon per minute (30 gallons per hour).

The brine solution in the reservoir, unless otherwise indicated, contained approximately 7000 p.p.m. NaCl (2730 p.p.m. Na+, 4200 p.p.m. Cl−) and 3000 p.p.m. $Na_2SO_4$ (930 p.p.m. Na+, 2000 p.p.m. $SO_4^{--}$). It was analyzed each day for Na+ and Cl− concentration, using a Beckman Expandomatic pH meter and appropriate electrodes. The sulfate ion was calculated from these two values, using the expression: p.p.m. $SO_4^{--}$ = (2.09 p.p.m. Na+ minus 1.35 p.p.m. Cl−). Sulfate ion concentrations were also determined independently by a titration method. These values usually agreed well with the calculated value.

The brine solution also contained a small amount of both ethyl violet and Rhodamine B. When a membrane contained a small pinhole, a pink-purple dot from these dyes was visible on the GS filter below the membrane after testing.

The membrane to be tested was cut to a 47-mm. diameter size and placed in the test cell atop two 47-mm. Millipore GS filter discs ($0.22\mu$ pore size; 45,000 GFD at 1500 p.s.i.). Depending upon the number of cells in operation, the brine solution was circulated through the cell and over the membrane at the rate of 200–400 ml./min. The membranes were kept first at 500 p.s.i. and then at 1000 p.s.i. for long enough times to collect enough permeate for analysis. The membranes were then kept at 1500 p.s.i. for extended lengths of time while permeate samples were measured and analyzed periodically.

Percent rejection of any ion was calculated from the p.p.m. of the ion in the permeate and the feed solution was as follows:

If X is any ion (e.g., Na+, Cl− or $SO_4^=$, then

Percent rejection of X $$= \frac{(\text{p.p.m. X in feed minus p.p.m. X in permeate})}{\text{p.p.m. X in feed}} \times 100$$

PERMEATE RATE AND ANALYSIS

Analysis of the permeate collected, compared to the feed solution, gave the following salt rejections at 1500 p.s.i.

TABLE 1

| | Percent rejection | | Flux, GFD |
|---|---|---|---|
| Time, min.:[1] | Na+ | Cl− | |
| 1,025 | 97.1 | 96.7 | 0.09 |
| 867 | 98.0 | 96.2 | 0.20 |
| 956 | 95.2 | 95.0 | 0.13 |

[1] Successive time increments.

EXAMPLES 2–5

Salt rejections (at 1500 p.s.i.) of membranes prepared in the same manner as Example 1 but with different amounts of the polyamide, or without it, are given in Table 2.

TABLE 2

| | Percent polyamide | Time, min.[1] | Percent rejection | | Flux, GFD |
|---|---|---|---|---|---|
| | | | Na+ | Cl− | |
| Example No.: | | | | | |
| 2 | 0 | | 4 | 5 | 162 |
| 3 | 40 | 1,025 | 95.2 | 94.7 | 0.09 |
| | | 867 | 86.3 | 85.5 | 0.21 |
| 4 | 75 | 1,025 | 97.2 | 95.7 | 0.11 |
| | | 867 | 95.9 | 95.0 | 0.21 |
| | | 956 | 96.3 | 95.7 | 0.12 |
| 5[2] | 0 | | 12 | 8 | 2.1 |

[1] Successive time increments.
[2] 85:15 (molar) copolymer of propylene oxide and allyl glycidyl ether.

EXAMPLE 6

A 2% solution of 80:20 (molar) propylene oxide-allyl glycidyl ether copolymer of RSV 10.4 was prepared in toluene. To 10 ml. of this solution was added 0.4 ml. of a 0.5% solution of bis(terephthal-beta-phenyl nitrone) in chloroform. (This coresponds to 1% cross-linked, based on polymer.) A film was cast with a 25-mil blade over a VF support prewet with water, in the manner of Example 1. Evaluation at 1500 p.s.i. gave 97.4% Na+ and 96.5% Cl− rejections, with a flux of 0.05 GFD.

As has been demonstrated in the examples, excellent reverse osmosis membranes can be prepared from the amorphous copolymers as herein specified. The wide variation which is possible in the chemical structure of the amorphous copolymers permits a wide variation in the properties of the resulting membranes to tailor them for many different applications.

The amorphous copolymers are known compositions having been described, inter alia, in U.S. Pat. 3,135,705 to E. J. Vandenberg. They are conveniently prepared by copolymerizing an allyl glycidyl ether with an alkylene oxide having from 2–6 carbon atoms, i.e., ethylene oxide, propylene oxide, the various isomeric butene oxides, pentene-1-oxide, etc. The degree of polymerization is controlled to give a polymer having an RSV of at least 0.5. Although in the broadest aspect, these copolymers can contain from 40–99 mole percent of alkylene oxide, with the balance allyl glycidyl ether, it is preferred when they are employed in uncross-linked form that the amount of alkylene oxide not exceed 85 mole percent of the copolymer.

As has been mentioned, the amorphous copolymer can be incorporated in the membrane either in the cross-linked or uncross-linked state. As a general rule, uncross-linked copolymers have only modest salt-rejecting capacities but relatively high flux rates and hence are useful in applications where a high salt-rejecting capacity is not required. Both the composition of the copolymer and the degree or absence of cross-linking or polyamide modification can be chosen to achieve a predetermined hydrophilic-hydrophobic balance that will result in the performance desired in the ultimate membrane. A high alkylene oxide content favors hydrophilic properties and a high allyl glycidyl ether content, hydrophobic properties. The more hydrophilic the copolymer, the greater the need for cross-linking or for addition of a polyamide. Substantial versatility is therefore achievable by balancing these considerations.

Cross-linking of the amorphous copolymers can be effected by the process of U.S. Pat. 3,390,204 employing a polyfunctional nitrile oxide or nitrone as the cross-linking agent. Any of the bis(nitrile oxides) or bis(nitrones) disclosed in the patent can be used as, for example, terephthal(bis-beta-phenyl nitrone); glyoxal(bis-beta-phenyl nitrone) or terephthal(bis-nitrile oxide), in an amount ranging from about 0.1 to 5% by weight of the polymeric epoxide with cross-linking being effected by holding at a temperature from 20–80° C. for at least 30 minutes. Other suitable cross-linking agents for the amorphous copolymers include the azidoformates of U.S. 3,211,752 and 3,284,421; the diazo esters of U.S. 3,226,381; and the aryl diazides of U.S. 3,297,659.

The cross-linking agent can either be incorporated into the copolymer prior to forming it into a film, or the agent can be allowed to diffuse into the film after casting. In all cases, of course, cross-linking is not completed until after the film has been formed.

When a polyamide is used for modifying the copolymer, it is desirably nonvolatile so that volatilization is avoided. It is primarily for this reason that the preferred polyamides are the low molecular weight dibasic polyamides prepared by the condensation of a dibasic fatty acid with an excess of an alkylene polyamine. The dibasic acid is preferably a dimerized fatty acid such as dimerized linoleic acid, dimerized soybean oil acids, and the like; and alkylene polyamine can be, for example, ethylenediamine, diethylenetriamine or triethylenetetramine. Many such polyamides are sold commercially. Those prepared from dimerized linoleic acid and ethylenediamine have the approximate structure

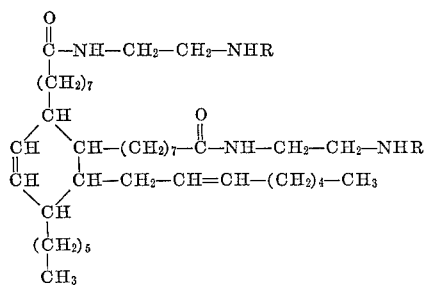

where R is hydrogen or another residue of linoleic acid dimer. These resins generally have molecular weights in the range of 1000–10,000 and softening points in the range of 0–190° C. Their preparation is described in more detail in U.S. Pats. 2,450,940, 2,705,223, 2,881,194 and 2,886,543, among others.

The amount of polyamide employed for modifying the amorphous copolymers is dependent primarily upon the properties desired in the ultimate membrane. For the aforesaid polyamides, the preferred amount ranges from about 2 to 150% by weight of the copolymer. Modification is effected by heating at temperatures ranging from about 50° to 155° C. for a time ranging from about 0.05 to 100 hours.

The examples have shown the preparation of planar membranes comprising a thin film of the amorphous copolymer supported on a microporous substrate permeable to salt ions. The thickness of the film can be varied considerably, for example, from less than 1 micron up to about 2.0 mils, but is desirably as thin as is obtainable by the process employed for its preparation. There has been illustrated preparation of films by solution casting. In addition, satisfactory films can be prepared by coating, spraying, compression molding and extrusion.

In the case of films in any form other than a hollow fiber, supporting of the film upon the substrate is necessary to provide a structure of sufficient strength. Useful substrates are well known in the art of reverse osmosis and can be prepared from various materials such as nylon, cellulose acetate, polyvinyl chloride, nitrocellulose, metal (particularly silver), polytetrafluoroethylene, and other materials. Desirably, the substrate should have as small a pore size as is consistent with permeability to salt ions. A suitable pore size is from about 0.01 to 5 microns.

In the preparation of planar membranes the film of copolymer can be cast or coated directly upon the substrate or the film can be separately formed and then laid upon the substrate. In using either procedure, prewetting of the substrate with a liquid which does not swell it is desirable to prevent expansion and contraction of the substrate during casting and drying.

It is also possible to fabricate membranes consisting of thin walled hollow fibers of the copolymer. In such case no substrate is necessary as the stresses to which a hollow fiber membrane is subjected in reverse osmosis processes are obviously different from those to which a planar membrane is subjected. However, composite hollow fibers in which a thin-salt-rejecting layer of the copolymer is deposited on a substrate can also be used.

Membranes of this invention are eminently useful for desalting brackish water and sea water. In addition they are also useful in other industrial applications employing the principle of reverse osmosis such as purification of water supplies, purification and concentration of process recycle streams, purification and concentration of waste streams before disposal, and concentration of various materials such as maple syrup, citrus juice, whey, coffee, soup, malt beverages, and spent sulfite pulping liquors. Thus, these membranes are useful in the food and beverage industry, the chemical industry, in the forest products industry and in the medicinal and pharmaceutical industries.

What I claim and desire to protect by Letters Patent is:

1. A reverse osmosis membrane comprising a thin film of a polymeric material supported upon a microporous substrate permeable to salt ions, said polymeric material comprising an amorphous copolymer of from 1 to 60 mole percent of allyl glycidyl ether and 40 to 99 mole percent of an alkylene oxide having from 2 to 6 carbon atoms having a reduced specific viscosity of at least 0.5 and a weight average molecular weight of at least 50,000.

2. The membrane of claim 1 in which the amorphous copolymer is modified by addition of a low molecular weight basic polyamide derived from a dibasic fatty acid.

3. The membrane of claim 1 in which the amorphous copolymer is a copolymer of allyl glycidyl ether and propylene oxide.

4. The process of desalinating water which comprises contacting saline water under pressure with the membrane of claim 1, whereby water molecules are caused to pass through the membrane while the salt ions are rejected from passing therethrough.

5. The membrane of claim 1 in which the amorphous copolymer is cross-linked.

6. The process of desalinating water which comprises contacting saline water under pressure with the membrane of claim 5, whereby water molecules are caused to pass through the membrane while the salt ions are rejected from passing therethrough.

7. The membrane of claim 5 in which the amorphous copolymer is a copolymer of allyl glycidyl ether and propylene oxide.

8. The membrane of claim 7 in which the amorphous copolymer is cross-linked by reaction with a bis(nitrile oxide) or bis(nitrone).

9. A reverse osmosis membrane consisting of a thin walled hollow fiber of an amorphous copolymer of from 1 to 60 mole percent of allyl glycidyl ether and 40 to 99 mole percent of an alkylene oxide having from 2 to 6 carbon atoms having a reduced specific viscosity of at least 0.5 and a weight average molecular weight of at least 50,000.

10. The membrane of claim 9 in which the amorphous copolymer is modified by addition of a low molecular weight basic polyamide derived from a dibasic fatty acid.

11. The membrane of claim 9 in which the amorphous copolymer is a copolymer of allyl glycidyl ether and propylene oxide.

12. The process of desalinating water which comprises contacting saline water under pressure with the membrane of claim 9, whereby water molecules are caused to pass through the membrane while the salt ions are rejected from passing therethrough.

13. The membrane of claim 9 in which the amorphous copolymer is cross-linked.

14. The process of desalinating water which comprises contacting saline water under pressure with the membrane of claim 13, whereby water molecules are caused to pass through the membrane while the salt ions are rejected from passing therethrough.

15. The membrane of claim 13 in which the amorphous copolymer is a copolymer of allyl glycidyl ether and propylene oxide.

15. The membrane of claim 13 in which the amorphous copolymer is cross-linked by reaction with a bis(nitrile oxide) or bis(nitrone).

References Cited

UNITED STATES PATENTS 3,276,996   10/1966   Lazare _____ 210—22

FRANK A. SPEAR, JR., Primary Examiner

U.S. Cl. X.R.

210—321, 490, 500